US009625984B2

United States Patent
Ramachandran et al.

(10) Patent No.: US 9,625,984 B2
(45) Date of Patent: Apr. 18, 2017

(54) TECHNOLOGIES FOR MANAGING POWER DURING AN ACTIVATION CYCLE

(71) Applicant: Intel Corporation, Santa Clara, CA (US)

(72) Inventors: Aswin Ramachandran, Austin, TX (US); Arvind Raman, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/671,750

(22) Filed: Mar. 27, 2015

(65) Prior Publication Data

US 2016/0282930 A1    Sep. 29, 2016

(51) Int. Cl.
 G06F 1/26 (2006.01)
 G06F 1/32 (2006.01)
 G06F 11/07 (2006.01)
(52) U.S. Cl.
 CPC .......... G06F 1/3296 (2013.01); G06F 1/3228 (2013.01); *G06F 1/3203* (2013.01); *G06F 1/324* (2013.01); *G06F 1/3287* (2013.01); *G06F 11/0724* (2013.01)

(58) Field of Classification Search
 CPC ...... G06F 1/3203; G06F 1/324; G06F 1/3296; G06F 1/3287; G06F 1/3234; G06F 11/0724
 USPC ........................................ 713/300, 320, 323
 See application file for complete search history.

(56) References Cited

U.S. PATENT DOCUMENTS

2006/0149975 A1* 7/2006 Rotem .................... G06F 1/206
                                                        713/300
2013/0111254 A1* 5/2013 Takayanagi ............... G06F 1/26
                                                        713/401

* cited by examiner

*Primary Examiner* — Michael J Brown
(74) *Attorney, Agent, or Firm* — Barnes & Thornburg LLP (57) ABSTRACT

Technologies of managing power during an activation cycle of a processor core or other compute domain include determining new operation limits for active processor cores or other compute domains during an activation cycle of a hibernating processor core or other hibernating compute domain to reduce the likelihood of a power surge during the activation of the hibernating processor core or other compute domain. The active processor cores or other compute domain are monitored until their operating points are at or below the new operating limits. Thereafter, the hibernating processor core or other hibernating compute domain is activated.

22 Claims, 5 Drawing Sheets

| Operating Limit | | Active Cores |
|---|---|---|
| Voltage | Frequency | |
| 2.0 | 3000 | 2 |
| 1.9 | 2900 | 3 |
| 1.8 | 2800 | 4 |
| 1.7 | 2700 | 5 |
| 1.6 | 2600 | 6 |
| 1.5 | 2500 | 7 |
| 1.4 | 2400 | 8 |

TECHNOLOGIES FOR MANAGING POWER DURING AN ACTIVATION CYCLE

BACKGROUND

A multi-core processor is a single computing component with two or more independent processor cores capable of executing program instructions. To balance the added benefits of increased processing power associated with multi-core processors and the increased cost of powering multi-core processors, some multi-core processors place processor cores in a hibernation state during periods of low usage. As more processing power is needed, the hibernating processor cores may be activated. In typical computing devices, activation of additional hibernating processor cores can increase the short-term power requirements of the processor, which can result in a spike of power draw (e.g., current) from the local power source. To compensate for such power requirements, the power source of the processor (e.g., a common voltage regulator) may be oversized to ensure the power source can accommodate the increase power demands during processor core activation, which can result in inefficiencies. Further, correction of peak power draw issues in the processor are difficult to correct post-production due to the integration of the power source.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
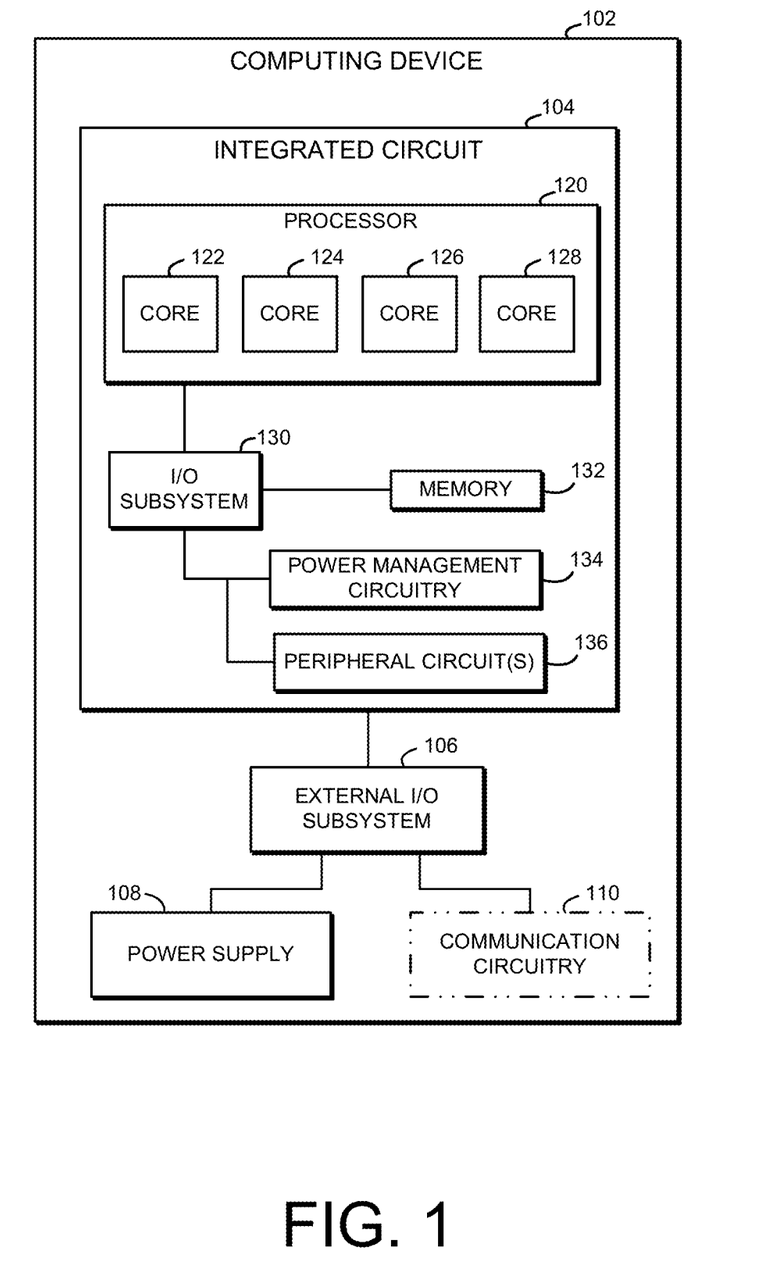
FIG. 1 is a simplified block diagram of at least one embodiment of a computing device for managing power during an activation cycle of a hibernating processor core.

Referring now to FIG. 1, an illustrative computing device 102 is configured to manage a power of one or more compute domains of the computing device 102 during an activation of a hibernating compute domain to reduce the likelihood of a power surge during such activation. Depending on the type of computing device 102, the power-managed compute domains may be embodied as any electronic device, circuit, or collection of electronic devices or circuits that are capable of independently entering and exiting a hibernated state (e.g., a low powered state). As such, although the technologies disclosed herein are described with regard to the power management of processor cores, it should be appreciated that such technologies are equally applicable to other compute domains of the computing device 102 (e.g., a compute domain of the integrated circuit 104 described below) capable of entering and exiting a hibernated state.

In the illustrative embodiment of FIG. 1, the computing device 102 is configured to manage the power of a local processor 120 during an activation cycle of one or more hibernating processor cores of the processor 120. To do so, as discussed in more detail below, the computing device 102 adjusts an operating limit of the processor and/or processor cores based on the number of currently active processor cores, including any hibernating processor cores to be activated. By adjusting the operating limit, the computing device 102 may control the total power consumed by the processor 120, while ensuring enough power is supplied to support the activation of a currently hibernating processor core as discussed below.

As with typical computing devices, the computing device 102 may place one or more processor cores of the processor 120 into a hibernation state while not in use. For example, a processor core of the processor 120 may be placed into a low power state, such as a C6 state. When one or more of the processor cores are hibernating, more power may be available to the remaining active processor cores, and a power source (e.g., a voltage regulator) of the computing device 102 may be configured to supply additional power to active processor cores to increase the performance of the active processor cores. However, activating or "waking up" a hibernating processor core while the active processor cores are receiving more power may cause a current surge, which may be greater than the maximum current rating of the power source. As such, as discussed below, the computing device 102 is configured to adjust the power operating limit of the active processor cores prior to waking up the desired hibernating processor core to ensure the total power consumed remains within the limits of the power source.

The computing device 102 may be embodied as any type of computation or computer device having a multi-core processor and capable of performing the functions described herein, including, without limitation, a smartphone, a tablet computer, a notebook computer, a laptop computer, a mobile computing device, a computer, a multiprocessor system, a server, a rack-mounted server, a blade server, a network appliance, a web appliance, a distributed computing system, a processor-based system, a consumer electronic device, or other multi-core processor-based computing device. As show in FIG. 1, the illustrative computing device 102 includes an integrated circuit 104, an external input/output (I/O) subsystem 106, a power supply 108, and may also include communication circuitry 110. Of course, the computing device 102 may include other or additional components, such as those commonly found in a computing device (e.g., various input/output devices), in other embodiments. Additionally, in some embodiments, one or more of the illustrative components may be incorporated in, or otherwise form a portion of, another component.

The integrated circuit 104 may be embodied as any type of integrated circuit having one or more sub-circuits and capable of performing the functions described herein. For example, in the illustrative embodiment, the integrated circuit 104 is embodied as a system-on-a-chip (SoC); however, in other embodiments the integrated circuit 104 may be embodied as other types of integrated circuits configured to perform one or more functions of the computing device 102. In the illustrative embodiment of FIG. 1, the integrated circuit 104 includes a processor 120, an I/O subsystem 130, a memory 132, a power management circuit 134, and one or more peripheral circuit(s) 136. Of course, the integrated circuit 104 may include additional or other components, sub-circuits, or devices in other embodiments based on the intended functions of the integrated circuit 104.

The processor 120 may be embodied as any type of multi-core processor capable of performing the functions described herein. In an illustrative embodiment, the processor 120 is embodied as a multi-core processor having four separate processor cores 122, 124, 126, 128. Of course, in other embodiments, the processor 120 may have fewer or more processor cores. The memory 132 may be embodied as any type of volatile or non-volatile memory or data storage capable of performing the functions described herein. In operation, the memory 132 may store various data and software used during operation of the computing device 102 such operating systems, applications, programs, libraries, and drivers. The memory 132 is communicatively coupled to the processor 120 via the I/O subsystem 130, which may be embodied as circuitry and/or components to facilitate input/output operations with the processor 120, the memory 132, and other components of the integrated circuit 104. For example, the I/O subsystem 130 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The integrated circuit 104 also includes a power management circuit 134, which is configured to manage power delivered to one or more other components of the integrated circuit 104, such as, for example, the processor cores 122, 124, 126, 128. As discussed in more detail below, the power management circuit 134 may be configured to adjust and/or regulate the power delivered to the managed components to ensure that constant voltages and/or currents are received by the managed components. In some embodiment, the power management circuitry 134 may be embodied as an adjustable regulated power supply, such as a voltage regulator. Of course, other power supply circuits may be used in other embodiments.

The peripheral circuit(s) 136 of the integrated circuit 104 may include any number of additional input/output devices, interface devices, and/or other peripheral devices. For example, the peripheral circuits 136 may include a digital signal processor core, memory blocks, or other circuits, such as oscillators, timers, or external interface circuits.

As discussed above, the computing device 102 also includes the external I/O subsystem 106. The external I/O subsystem 106 may be embodied as circuitry and/or components to facilitate input/output operations with the integrated circuit 104, the power supply 108, and other components of the computing device 102. For example, the external I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The power supply 108 of the computing device 102 may be embodied as any power circuit, device, or collection thereof, capable of delivering electric energy to an electrical load. The power supply 108 may be configured to convert electrical energy from one form to another, for example, converting alternating current electrical energy to direct current electrical energy. The power supply 108 may be configured to output multiple power variations of output voltages and output currents at the same time. In some embodiments, the power supply 108 may be embodied as an adjustable regulated power supply, a battery, or other power source.

The computing device 102 may also include the communication subsystem 110, which may be embodied as any communication circuit, device, or collection thereof, capable of enabling communications between the computing device 102 and other remote devices over a computer network (not shown). The communication subsystem 110 may be configured to use any one or more communication technology (e.g., wired or wireless communications) and associated protocols (e.g., Ethernet, Bluetooth®, Wi-Fi®, WiMAX, etc.) to effect such communication.

Additionally, in some embodiments, the computing device 102 may include a data storage device (not shown), which may be embodied as any type of device or devices configured for short-term or long-term storage of data such as, for example, memory devices and circuits, memory cards, hard disk drives, solid-state drives, or other data storage devices. The data storage device may store various data used by the computing device 102 during operation. Of course, the computing device 102 may include additional or other peripheral devices in other embodiments.

Figure 2:
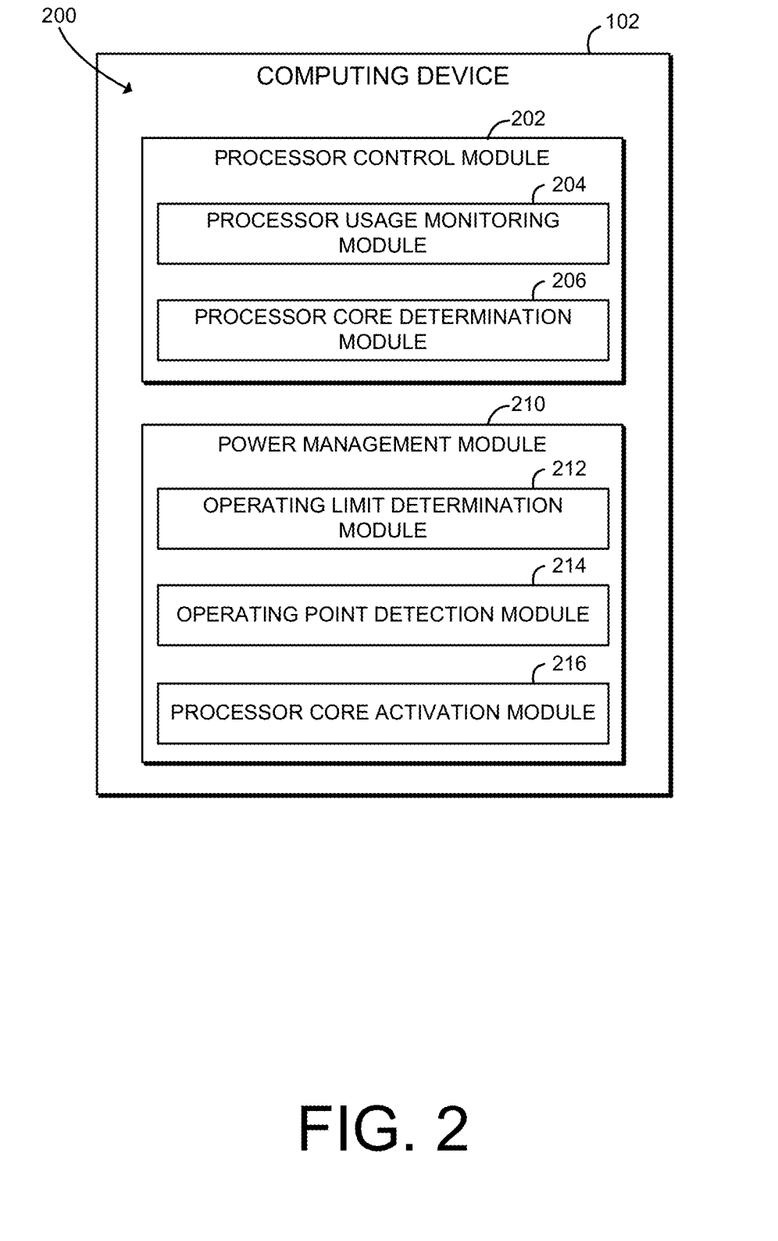
FIG. 2 is a simplified block diagram of at least one embodiment of an environment that may be established by the computing device of FIG. 1.

Referring now to FIG. 2, during operation, the computing device 102 establishes an environment 200. The illustrative embodiment 200 includes a processor control module 202 and a power management module 210. The various modules of the environment 200 may be embodied as hardware, firmware, software, or a combination thereof. For example the various modules, logic, and other components of the environment 200 may form a portion of, or otherwise be established by, the processor 120, the power management circuitry 134, or other hardware components of the computing device 102. As such, in some embodiments, any one or more of the modules of the environment 200 may be embodied as a circuit or collection of electrical devices (e.g., a processor control circuit, a power management circuit, etc.).

As discussed below, the processor control module 202 and the power management module 210 cooperate to control or limit the power delivered to the individual processor cores 122, 124, 126, 128 of the processor 120 during peak current times, such as, for example, during an activation cycle of a hibernating processor core. In some embodiments, a portion of the power management module 210 may be embodied as a combination of software and firmware to optimize the power usage of the processor 120 during the activation cycles of one or more hibernating processor cores. For example, the basic input/output system (BIOS) or the operating system power management (OSPM) may adjust the power usage of each processor core 122, 124, 126, 128 during an activation cycle of a hibernating processor core to reduce current surges, and still maintain the performance of the processor cores.

The processor control module 202 is configured to manage the operations of the processor 120, including determining when individual processor cores should be active or hibernating. The processor control module 202 illustratively includes a processor usage monitoring module 204 and a processor core determination module 206.

The processor usage monitoring module 204 is configured to monitor the usage of the processor 120. The processor usage monitoring module 204 may also be configured to monitor the usage of each individual processor core 122, 124, 126, 128 of the processor 120. By monitoring the usage of the processor 120 and/or the processor cores 122, 124, 126, 128, the processor control module 202 can determine how to increase performance of the processor 120 and reduce overall power usage of the processor 120 as discussed below.

The processor core determination module 206 is configured to determine the desired state of each processor core of the processor 120 based on the present requirements. For example, the processor core determination module 206 may be configured to determine how many active cores are necessary based on the measured overall usage of the processor 120 and the usages of each individual processor. If the processor 120 is not being used heavily, the processor core determination module 206 may determine that one or more processor cores 122, 124, 126, 128 can be placed into a hibernation state. It should be appreciated that some workload processes may be divisible between the processor cores 122, 124, 126, 128. As such, the processor core determination module 206 examines both the measured overall usage of the processor 102 and the usage of each individual active processor core 122, 124, 126, 128. For example, the measured overall usage of the processor 120 may indicate that the processor 120 requires more than one processor core 122, 124, 126, 128 active, but the present workload process may not be divisible between processor cores. In this example, the unused processor cores 122, 124, 126, 128 may be put in a hibernation state, even though the overall usage of the processor 120 is high.

In some embodiments, the processor core determination module 206 may also actively control the activation and hibernation of the processor cores 122, 124, 126, 128. For example, the processor core determination module 206 may initiate an activation request to cause a hibernating processor core to switch state from a hibernation state to an active state or, alternatively, to cause an active processor core to switch state from an active state to a hibernation state (e.g., a C6 state).

The power management module 210 is configured to manage the operating limits of the processor 120 and/or each processor core 122, 124, 126, 128. The power management module 210 includes an operating limit determination module 212, an operating point detection module 214, and a processor core activation module 216. In use, as discussed below, the power management module 210 is configured to reduce current surges during an activation cycle of a hibernating processor core by adjusting the operating limit of active processor cores of the processor 120.

The operating limit determination module 212 is configured to determine an operating limit of the processor 120 and/or the processor cores 122, 124, 126, 128. In some embodiments, the operating limit may be embodied as a voltage limit and/or frequency limit imposed on the processor 120 and/or the processor cores 122, 124, 126, 128 that are currently active. The operating limit defines an upper threshold beyond which the processor 120 will not generally be allowed operate. For example, if the voltage operating limit for the processor 120 is set at 5 volts, the processor 120 will not be allowed to operate at a voltage greater than 5 volts, even if the processor 120 requests additional power. The operating limit determination module may set an operating limit for the entire processor 120, or individual operating limits for individual active processor cores 122, 124, 126, 128 as discussed below.

Of course, the operating limit may be embodied as other characteristics depending on the particular compute domain being managed. In other words, the operating limit may be embodied as any aspect of a power-managed compute domain of the computing device 102 that is capable of being limited, regulated, or otherwise adjusted. For example, the operating limit may be embodied as any characteristic that may be throttled or activity that may be stalled to reduce a related power consumption. In some embodiments, the operating limit may be embodied as a binary limit or otherwise have discrete states (e.g., an "on" or "off" state), depending on the particular characteristic being controlled. As such, it should be appreciated that the operating voltage and operating frequency of the processor cores 122, 124, 126, 128 (or other computing domain) is only illustrative and that other types and thresholds of operating limits may be used in other embodiments.

In the illustrative embodiment, the operating limit determination module 212 is configured to determine the operating limit based on the number of active processor cores. For example, if two processor cores are active the operating limit of the active processor cores may be 1.2 volts per processor core. Whereas, if three processor cores are active the operating limit of the active processor cores may be 1.0 volts per processor core.

When the power management module 210 receives an activation request from the processor control module 202 to activate a hibernating processor core, the operating limit determination module 212 determines a new operating limit for the active processor cores based on the current number of active processor cores and the activation request (i.e., how many hibernating processor cores will be activated). For example, if two processor cores are active and the activation request includes a command that one hibernating processor core is activated, the operating limit determination module 212 will set the new operating limit for three active processor cores (i.e., the two currently active processor cores and the newly-active hibernating processor core). The new operating limit will typically be lower than the previous operating limit if additional hibernating processor cores are set to become active. Similarly, if the power management module 210 receives a deactivation request from the processor control module 202, the operating limit determination module 212 may set a new operating limit for the remaining active processor cores, which may be higher than the previous operating limit. In some embodiments, the operating limit determination module 212 determines a separate or specific operating limit for the hibernating processor core being activated. In this way, the hibernating processor core can be activated quickly while reducing the likelihood of a power surge.

The operating point detection module 214 is configured to monitor the operating point of the processor 120 and/or the processor cores 122, 124, 126, 128. In this way, the operating point detection module 214 may ensure the processor 120 and the associated processor cores 122, 124, 126, 128 are operating at or below the currently set operating limit (e.g., operating voltage, operating frequency, etc.). Such validation of the operating points of the processor 120 and/or processor cores 122, 124, 126, 128 may reduce the likelihood of a power surge by ensuring any currently active processor cores 122, 124, 126, 128 are operating at the new operating limit prior to activating a currently hibernating core or set of cores. In some embodiments, the operating point detection module 214 may detect either the operating voltage, the operating frequency, or other operating point of the processor 120, and/or may detect the operating voltage, operating frequency, or other operating point of the processor cores 122, 124, 126, 128 individually.

In some embodiments, the operating point detection module 214 may include or be embodied as a timer configured to wait a reference amount of time between setting a new operating limit and beginning an activation cycle of a hibernating processor core. The reference amount of time may change based on the differences in the old operating limit and the new operating limit. For example, if the new operating limit is substantially lower than the old operating limit, then the operating point detection module 214 may allow more time for the operating points of the processor cores 122, 124, 126, 128 to move to or below the new operating limit.

The processor core activation module 216 is configured to begin the activation cycle of one or more hibernating processor cores as requested in the activation request. For example, in some embodiments, the activation request may identify the specific processor core 122, 124, 126, 128 to be activated. After the new operating limit has been set and the active processor cores are operating at or below the new operating limit, the hibernating processor core(s) requested by the activation request re activated. In some embodiments, the processor core activation module 216 reports to the processor control module 202 that the hibernating processor core can be fully activated.

Figure 3:
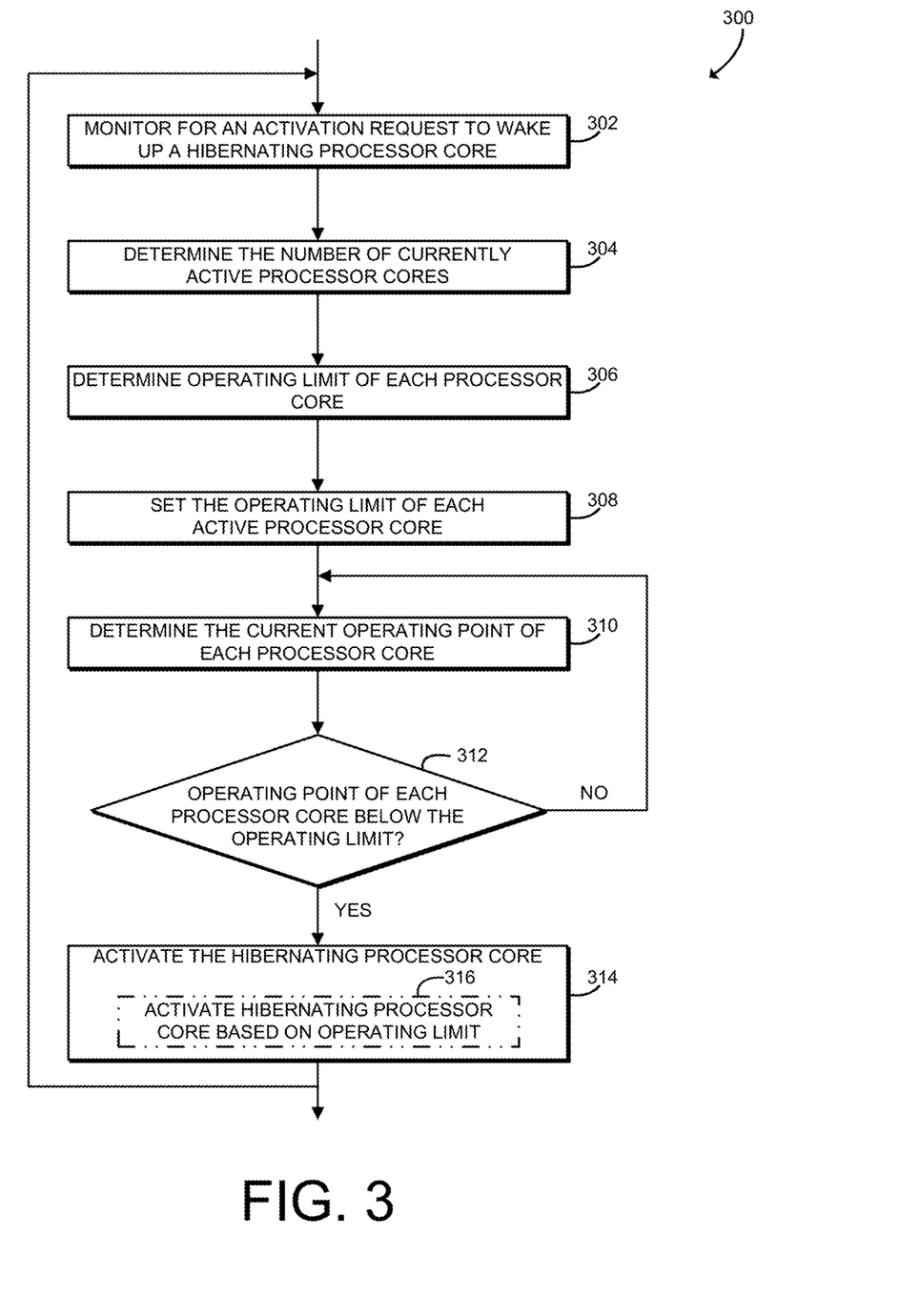
FIG. 3 is a simplified flow diagram of at least one embodiment of a method for managing power during an activation cycle of a hibernating processor core that may be executed by the computing device of FIG. 1.

Referring to FIG. 3, in use, the computing device 102 may execute a method 300 for managing power during an activation cycle of a hibernating processor core. In block 302, the computing device 102 monitors for an activation request to activate one or more hibernating processor cores. As discussed above, the activation request may identify the specific number of hibernating processor cores to be activated and/or the specific hibernating core(s) to be activated. In other embodiments, the number of hibernating processor cores to be activated may be determined or inferred by the present workload and/or expected workload of the processor 120.

In block 304, after receiving an activation request, the computing device 102 determines the number of currently active processor cores. Subsequently, in block 306, the computing device 102 determines a new operating limit for each active processor core, including any currently hibernating cores that are to become activated. That is, the computing device 102 determines a new operating limit based on the total number of processor cores that will be active after activation of any hibernating processor cores as requested in the activation requires. As discussed above, the computing device 102 may determine an operating limit for the processor 120 as a whole and/or an operating limit for each active processor core. In some embodiments, the computing device 102 may determine a new operating limit for each active processor core that is the same for each active processor core. In other embodiments, the computing device 102 may determine a different operating limit for one or more of the active processor cores based on, for example, individual characteristics of each processor core, including the specifications of the processor core and the processes currently being run by the processor core.

In block 308, the computing device 102 sets the operating limit for the processor 120 and/or the individual active processor cores. Subsequently, in block 310, the computing device 102 determines the current operating point of the processor 120 and/or the individual active processor cores. To do so, the computing device 102 may measure or monitor a signal indicative of the operating voltage and/or clock frequency of the processor 120 and/or active processor cores.

Subsequently, in block 312, the computing device 102 determines whether the determined operating point of the processor 120 and/or the individual active processor cores is at or below the new operating limit set in block 308. If not, the method 300 loops back to block 310 in which the operating point of the processor 120 and/or active processor cores is again determined. In this way, the computing device 102 is configured to set a new operating limit for the processor 120 and/or active processor cores and subsequently monitor the current operating point of the processor 120 and/or active processor cores until the determined operating point of the processor 120 and/or active processor cores is at or below the new operating limit set in block 308.

If the computing device 102 determines that the operating point of the processor 120 and/or active processor cores is at or below the new operating limit set in block 308, the method 300 advances to block 314. In block 314, the computing device 102 activates the one or more hibernating processor cores identified by, or otherwise based on, the activation request. To do so, in some embodiments, the computing device 102 activates the hibernating processor core(s) and sets its operating limit to the new operating limit determined in block 306. In other embodiments, the computing device 102 may set the operating limit of the newly activated hibernating processor core(s) to a different operating limit, which may be lower or greater than the operating limit determined in block 306. For example, the computing device 102 may set the operating limit of the newly activated hibernating processor core to the lowest available operating point. Alternatively, if the workload of the newly activated hibernating processor core is sufficiently large, the computing device 102 may set the operating limit of the newly activated hibernating processor core to a higher limit than that determined in block 306. Regardless, after the requested hibernating processor core(s) have been activated in block 314, the method 300 loops back to block 302 to monitor for additional activation requests.

Figure 4:
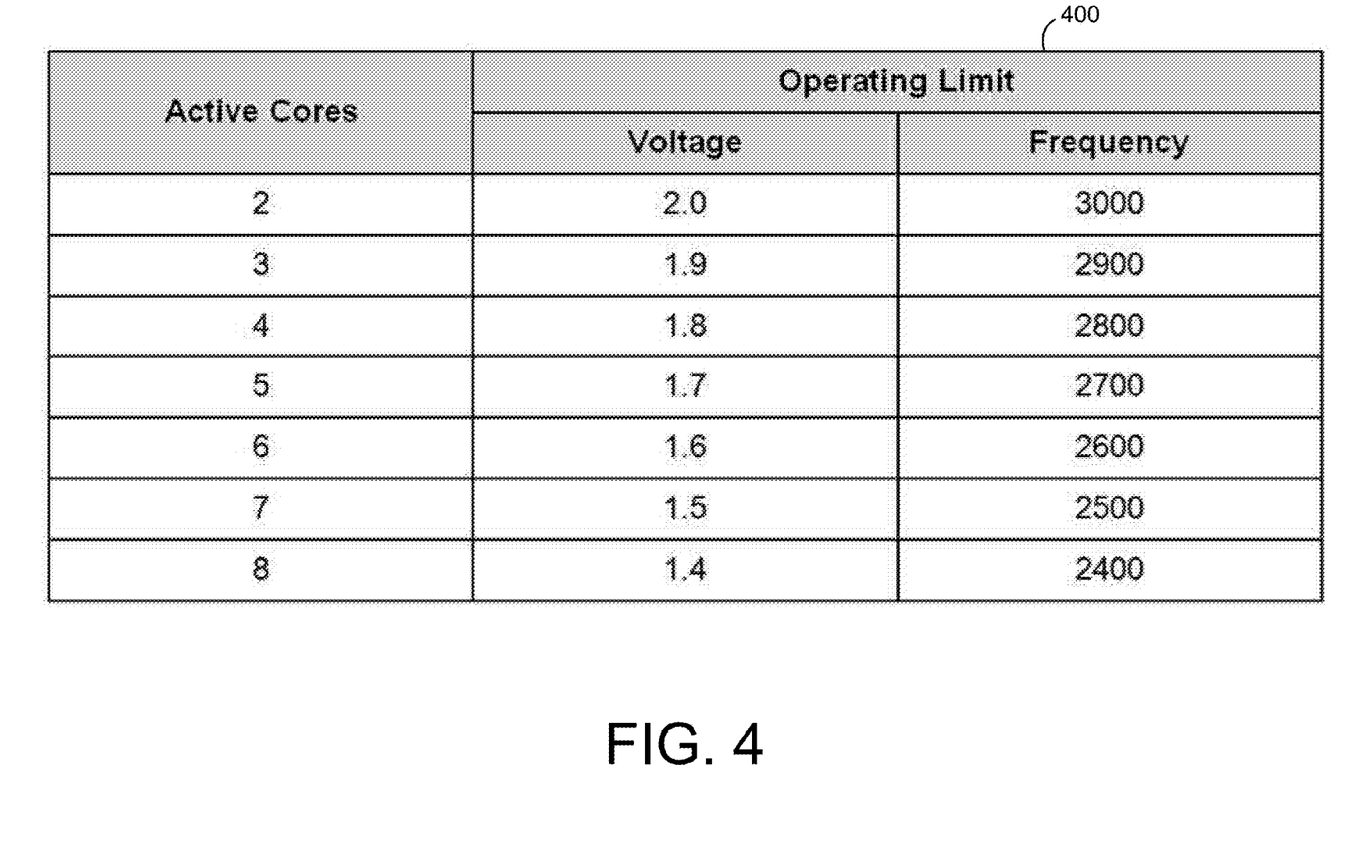
FIG. 4 is a simplified table showing an illustrative embodiment of operating limits that may be set by the power management system of FIG. 1.

Referring to FIG. 4, an illustrative embodiment of a look-up table 400 that may be used by the power management circuit 134 and the power management module 210 is shown. The table 400 includes operating limits indexed by the number of active processor cores, which includes any hibernating processor cores to be activated as discussed above. For example, if five processor cores are to be active, then the voltage operating limit may be set to 1.7 volts and the frequency operating limit may be set to 2700 MHz. Of course, it should be appreciated that the values presented in table 400 are merely illustrative and that other operating limit values may be used in other embodiments.

Figure 5:
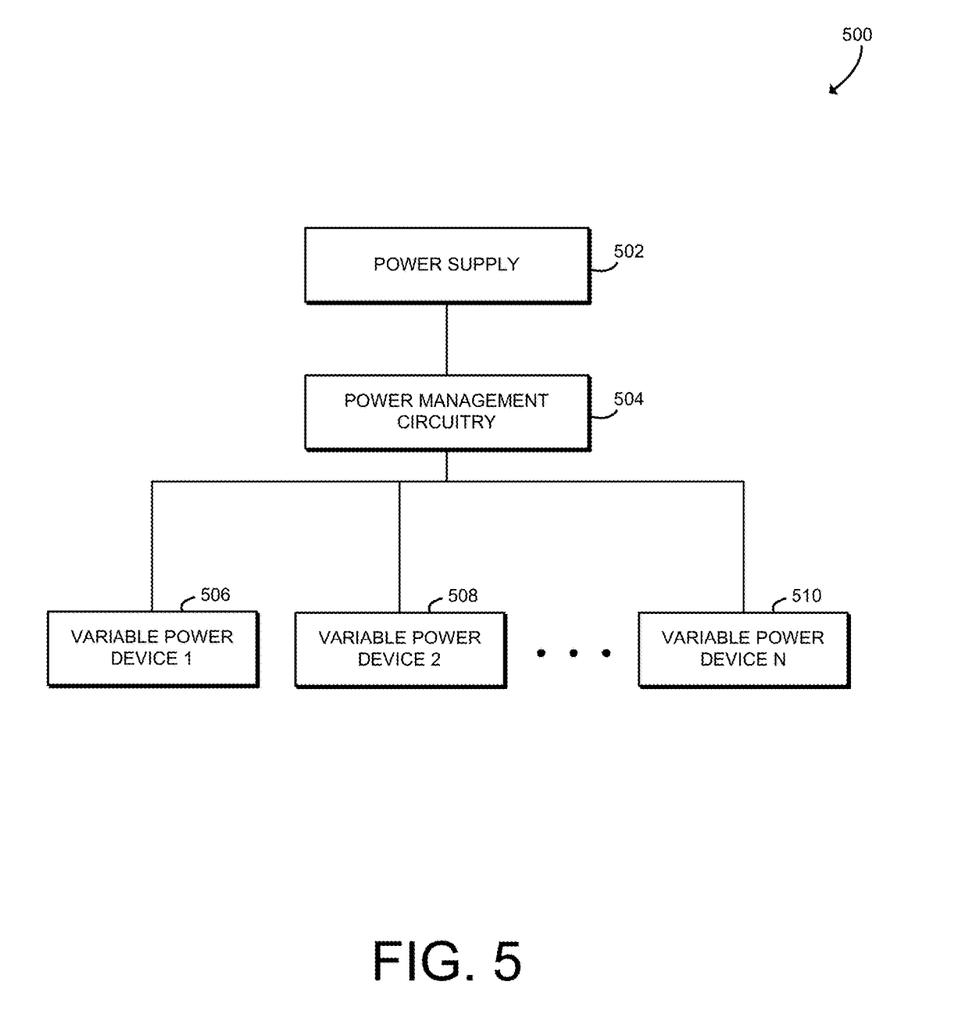
FIG. 5 is a simplified block diagram of at least one embodiment of a power management system for managing power during an activation cycle of a variable power device.

As discussed above, the method and technologies disclosed herein may be used to control the operating limits of any type of compute domains of the computing device 102 capable of entering and exiting a hibernated or low power state. For example, the disclosed technologies may be used to control the operating limits of other types of electronic device and/or circuits in addition to or instead of the processor cores discussed above. In particular, the disclosed technologies may be used with any type of electronic device having a variable power operating point. For example, as shown in FIG. 5, an illustrative power management system 500 may include a power supply 502, power management circuity 504, and one or more variable power devices 506, 508, 510. The power supply 502 may be embodied as any type of power supply and may be similar to the power supply 108 described above. Additionally, the power management circuitry 504 is illustratively embodied as a management circuit having functionality similar to that of the power management circuit 134, the description of which is equally applicable to the power management circuitry 504 and is not repeated herein for clarity of description.

As shown in FIG. 5, the variable power devices 506, 508, 510 are connected to the power management circuitry 504, which may be embodied as a voltage regulator as described above in regard to the power management circuit 134. Each variable power device may be embodied as any type of electronic device or circuit capable of operating using varying amounts of power. For example, any one or more of the variable power devices 506, 508, 510 may be embodied as a silicon-based circuit or device, such as an digital signal processor, an inverter circuit, a graphics processor, or other silicon-based device, or as a hardware device such as a variable-speed motor, actuator, blower, or the like. As such, the system 500 may include multiple variable power devices having different types of structure and functionality.

In operation, the power management system 500 operates similarly to the computing device 102 previously disclosed. For example, the power management circuitry 504 may execute the method 300 described above to activate a hibernating variable power device. To do so, as discussed in detail above and in response to an activation request, the power management circuitry 504 may determine the number of currently active variable power devices, determine a new operating limit for the active variable power devices based on the number of currently active variable power devices and the number of hibernating variable power devices to be activated, and set the operating limit for the currently active variable power devices to the new operating limit. After the power management circuitry 504 verifies that the currently active available power devices are operating at or below the new operating limit, the power management circuitry 405 may activate the currently hibernating variable power device(s). Additionally, the power management circuitry 504 may set the operating limit of the newly activated hibernating variable power device(s) to the new operating limit, to an operating limit below the new operating limit, or to an operating limit above the new operating limit based on the characteristics of the activated hibernating variable power device, the workload to be accomplished by the activated hibernating variable power device, and/or other criteria.

EXAMPLES

Illustrative examples of the technologies disclosed herein are provided below. An embodiment of the technologies may include any one or more, and any combination of, the examples described below.

Example 1 includes a computing device for managing power during a processor core activation cycle, the computing device comprising a processor control module to (i) determine a number of active processor cores of a processor of the computing device and (ii) receive an activation request for at least one hibernating processor core of the processor of the computing device, wherein the activation request includes a command that the at least one hibernating core become active; and a power management module (i) determine a new operating limit for each active processor core based on the number of active processor cores and the activation request, (ii) set an operating limit of each active processor core to the new operating limit, and (iii) cause, in response to the activation request, activation of the at least one hibernating processor core subsequent to setting the operating limit of each active processor core.

Example 2 includes the subject matter of Example 1, and wherein to set the operating limit comprises to set a starting operating limit of each hibernating processor core identified by the activation request to the new operating limit.

Example 3 includes the subject matter of any of Examples 1 and 2, and wherein to determine the new operating limit for each active processor core comprises to determine the new operating limit for each processor core based on the number of active processor cores and the number of hibernating processor cores identified by the activation request.

Example 4 includes the subject matter of any of Examples 1-3, and wherein to determine the number of active processor cores comprises to determine that at least one processor core is currently in a hibernation state.

Example 5 includes the subject matter of any of Examples 1-4, and further including the power management module is further to determine an operating point of each active processor core.

Example 6 includes the subject matter of any of Examples 1-5, and wherein the power management module is further to determine whether the operating point of each active processor core is at, or below, the new operating limit.

Example 7 includes the subject matter of any of Examples 1-6, and wherein the at least one hibernating processor core is a processor core in a low power state.

Example 8 includes the subject matter of any of Examples 1-7, and wherein to determine the new operating limit for each active processor core comprises to determine a voltage operating limit for each active processor core based on the number of active processor cores and the activation request.

Example 9 includes the subject matter of any of Examples 1-8, and, wherein to determine the new operating limit for each active processor core comprises to determine a frequency operating limit for each active processor core based on the number of active processor cores and the activation request.

Example 10 includes the subject matter of any of Examples 1-9, and wherein to determine the new operating limit for each active processor core comprises to determine a voltage operating limit and a frequency operating limit for each active processor core based on the number of active processor cores and the activation request.

Example 11 includes a power management system for managing power of a plurality of variable power devices during an activation cycle of another variable power device, the computing device comprising a power management circuit to (i) receive an activation request for a hibernating variable power device of the plurality of variable power devices, (ii) determine a number of active variable power devices of the plurality of variable power devices, (iii) determine a new operating limit for each active variable power device based on the number of active variable power devices and the activation request, (iv) set an operating limit of each active variable power device to the corresponding new operating limit, and (v) activate the hibernating variable power device, in response to receiving the activation request, and subsequent to setting the operating limit of each active variable power device.

Example 12 includes the subject matter of Example 11, and wherein to determine the new operating limit of each active variable power device comprises to determine operational requirements of each active variable power device.

Example 13 includes the subject matter of any of Examples 11 and 12, and wherein to set the operating limit of each of active variable power device comprises to set a different operating limit of each active variable power device.

Example 14 includes the subject matter of any of Examples 11-13, and wherein to determine the new operating limit comprises to (i) determine the new operating limit for each active variable power device based on the number of active variable power devices and the activation request; and (ii) determine a starting operating limit for the hibernating variable power device included in the activation request.

Example 15 includes the subject matter of any of Examples 11-14, and wherein to determine the starting operating limit for the hibernating variable power device comprises to determine operational requirements for the hibernating variable power device included in the activation request.

Example 16 includes the subject matter of any of Examples 11-15, and wherein to set the new operating limit comprises to set a different active operating limit for each active variable power device and a different starting operating limit for the hibernating variable power device included in the activation request.

Example 17 includes the subject matter of any of Examples 11-16, and wherein the power management circuit is further to determine an operating point of each active variable power device.

Example 18 includes the subject matter of any of Examples 11-17, and wherein to determine the operating point comprises to determine whether the operating point of each active variable power device is at, or below, the new operating limit.

Example 19 includes a method of managing power during a processor core activation cycle, the method comprising determining, by a computing device, a number of active processor cores of a processor of the computing device; receiving an activation request for at least one hibernating processor core of the processor of the computing device, wherein the activation request includes a command that the at least one hibernating core become active; determining, by the computing device, a new operating limit for each active processor core based on the number of active processor cores and the activation request; setting, by the computing device, an operating limit of each active processor core to the new operating limit; and activating, by the computing device and in response to the activation request, the at least one hibernating processor core subsequent to setting the operating limit of each active processor core.

Example 20 includes the subject matter of Example 19, and further comprising setting, by the computing device, a starting operating limit of each hibernating processor core identified by the activation request to the new operating limit.

Example 21 includes the subject matter of any of Examples 19 and 20, and wherein determining the new operating limit for each active processor core comprises determining, by the computing device, the new operating limit for each processor core based on the number of active processor cores and the number of hibernating processor cores identified by the activation request.

Example 22 includes the subject matter of any of Examples 19-21, and wherein determining the number of active processor cores comprises determining, by the computing device, that at least one processor core is currently in a hibernation state.

Example 23 includes the subject matter of any of Examples 19-22, and further including determining, by the computing device, an operating point of each active processor core.

Example 24 includes the subject matter of any of Examples 19-23, and further including determining, by the computing device, whether the operating point of each active processor core is at, or below, the new operating limit.

Example 25 includes the subject matter of any of Examples 19-24, and wherein determining the number of hibernating processor cores in the processor comprises determining, by the computing device, which processor cores are in a low power state.

Example 26 includes the subject matter of any of Examples 19-25, and wherein determining the new operating limit for each active processor core comprises determining, by the computing device, a voltage operating limit for the each active processor core based on the number of active processor cores and the activation request.

Example 27 includes the subject matter of any of Examples 19-26, and wherein determining the new operating limit for each active processor core comprises determining, by the computing device, a frequency operating limit for each active processor core based on the number of active processor cores and the activation request.

Example 28 includes the subject matter of any of Examples 19-27, and wherein determining the new operating limit for each active processor core comprises determining, by the computing device, a voltage operating limit and a frequency operating limit for each active processor core based on the number of active processor cores and the activation request.

Example 29 includes a method of managing power during an activation cycle of a plurality of variable power device of a power management system, the method comprising receiving an activation request for a hibernating variable power device of the plurality of variable power devices; determining, by the power management system, a number of active variable power devices of the plurality of variable power devices; determining, by the power management system, a new operating limit for each active variable power device based on the number of active variable power devices and the activation request; setting, by the power management system, an operating limit of each active variable power device to the corresponding new operating limit; and activating, by the power management system, the hibernating variable power device subsequent to setting the operating limit of each active variable power device.

Example 30 includes the subject matter of Example 29, and wherein determining the new operating limit of each active variable power device comprises determining, by the power management system, operational requirements for each active variable power device.

Example 31 includes the subject matter of any of Examples 29 and 30, and wherein setting the operating limit of each active variable power device comprises setting, by the power management system, a different operating limit of each active variable power device.

Example 32 includes the subject matter of any of Examples 29-31, and wherein determining the new operating limit comprises (i) determining, by the power management system, the new operating limit for each active variable power device based on the number of active variable power devices and the activation request; and (ii) determining, by the power management system, a starting operating limit for the hibernating variable power device included in the activation request.

Example 33 includes the subject matter of any of Examples 29-32, and wherein determining the starting operating limit for the hibernating variable power device comprises determining, by the power management system, operational requirements for the hibernating variable power device included in the activation request.

Example 34 includes the subject matter of any of Examples 29-33, and wherein setting the new operating limit comprises setting, by the power management system, a different active operating limit for each active variable power device and a different starting operating limit for the hibernating variable power device identified by the activation request.

Example 35 includes the subject matter of any of Examples 29-34, and further including determining, by the power management system, an operating point of each active variable power device.

Example 36 includes the subject matter of any of Examples 29-35, and further including determining, by the power management system, whether the operating point of each active variable power device is at, or below, the new operating limit.

Example 37 includes one or more computer-readable storage media comprising a plurality of instructions stored thereon that, in response to execution, cause a computing device to perform the method of any of Examples 19-36.

Example 38 includes a computing device for managing power during a processor core activation cycle, the computing device comprising means for determining a number of active processor cores of a processor of the computing device; means for receiving an activation request for at least one hibernating processor core of the processor of the computing device, wherein the activation request includes a command that the at least one hibernating core become active; means for determining a new operating limit for each active processor core based on the number of active processor cores and the activation request; means for setting an operating limit of each active processor core to the new operating limit; and means for activating, in response to the activation request, the at least one hibernating processor core subsequent to setting the operating limit of each active processor core.

Example 39 includes the subject matter of Example 38, and further comprising means for setting a starting operating limit of each hibernating processor core identified by the activation request to the new operating limit.

Example 40 includes the subject matter of any of Examples 38 and 39, and wherein the means for determining the new operating limit for each active processor core comprises means for determining the new operating limit for each processor core based on the number of active processor cores and the number of hibernating processor cores identified by the activation request.

Example 41 includes the subject matter of any of Examples 38-40, and wherein the means for determining the number of active processor cores comprises means for determining that at least one processor core is currently in a hibernation state.

Example 42 includes the subject matter of any of Examples 38-41, and further including means for determining an operating point of each active processor core.

Example 43 includes the subject matter of any of Examples 38-42, and further including means for determining whether the operating point of each active processor core is at, or below, the new operating limit.

Example 44 includes the subject matter of any of Examples 38-43, and wherein the means for determining the number of hibernating processor cores in the processor comprises means for determining which processor cores are in a low power state.

Example 45 includes the subject matter of any of Examples 38-44, and wherein the means for determining the new operating limit for each active processor core comprises means for determining a voltage operating limit for the each active processor core based on the number of active processor cores and the activation request.

Example 46 includes the subject matter of any of Examples 38-45, and wherein the means for determining the new operating limit for each active processor core comprises means for determining a frequency operating limit for each active processor core based on the number of active processor cores and the activation request.

Example 47 includes the subject matter of any of Examples 38-46, and wherein the means for determining the new operating limit for each active processor core comprises means for determining, by the computing device, a voltage operating limit and a frequency operating limit for each active processor core based on the number of active processor cores and the activation request.

Example 48 includes a power management system for managing power during an activation cycle of a plurality of variable power device of a power management system, the power management system comprising means for receiving an activation request for a hibernating variable power device of the plurality of variable power devices; means for determining a number of active variable power devices of the plurality of variable power devices; means for determining a new operating limit for each active variable power device based on the number of active variable power devices and the activation request; means for setting an operating limit of each active variable power device to the corresponding new operating limit; and means for activating the hibernating variable power device subsequent to setting the operating limit of each active variable power device.

Example 49 includes the subject matter of Example 48, and wherein the means for determining the new operating limit of each active variable power device comprises means for determining operational requirements for each active variable power device.

Example 50 includes the subject matter of any of Examples 48 and 49, and wherein the means for setting the operating limit of each active variable power device comprises means for setting a different operating limit of each active variable power device.

Example 51 includes the subject matter of any of Examples 48-50, and wherein the means for determining the new operating limit comprises (i) means for determining the new operating limit for each active variable power device based on the number of active variable power devices and the activation request; and (ii) means for determining a starting operating limit for the hibernating variable power device included in the activation request.

Example 52 includes the subject matter of any of Examples 48-51, and wherein the means for determining the starting operating limit for the hibernating variable power device comprises means for determining operational requirements for the hibernating variable power device included in the activation request.

Example 53 includes the subject matter of any of Examples 48-52, and wherein the means for setting the new operating limit comprises means for setting a different active operating limit for each active variable power device and a different starting operating limit for the hibernating variable power device identified by the activation request.

Example 54 includes the subject matter of any of Examples 48-53, and further including means for determining an operating point of each active variable power device.

Example 55 includes the subject matter of any of Examples 48-54, and further including means for determining whether the operating point of each active variable power device is at, or below, the new operating limit.

The invention claimed is:

1. A computing device for managing power during a processor core activation cycle, the computing device comprising:
   a processor control module to (i) determine a number of active processor cores of a processor of the computing device and (ii) receive an activation request for at least one hibernating processor core of the processor of the computing device, wherein the activation request includes a command that the at least one hibernating processor core become active; and
   a power management module to (i) determine a new operating limit for each active processor core based on the number of active processor cores and the number of hibernating processor cores identified by the activation request, (ii) set an operating limit of each active processor core to the new operating limit, and (iii) cause, in response to the activation request, activation of the at least one hibernating processor core subsequent to setting the operating limit of each active processor core.

2. The computing device of claim 1, wherein the power management module is further to determine an operating point of each active processor core.

3. The computing device of claim 2, wherein the power management module is further to determine whether the operating point of each active processor core is at, or below, the new operating limit.

4. The computing device of claim 1, wherein the at least one hibernating processor core is a processor core in a low power state.

5. The computing device of claim 1, wherein to determine the new operating limit for each active processor core comprises to determine a voltage operating limit for each active processor core based on the number of active processor cores and the activation request.

6. The computing device of claim 1, wherein to determine the new operating limit for each active processor core comprises to determine a voltage operating limit and a frequency operating limit for each active processor core based on the number of active processor cores and the activation request.

7. A method of managing power during a processor core activation cycle, the method comprising:
   determining, by a computing device, a number of active processor cores of a processor of the computing device;
   receiving an activation request for at least one hibernating processor core of the processor of the computing device, wherein the activation request includes a command that the at least one hibernating processor core become active;
   determining, by the computing device, a new operating limit for each active processor core based on the number of active processor cores and the number of hibernating processor cores identified by the activation request;
   setting, by the computing device, an operating limit of each active processor core to the new operating limit; and
   activating, by the computing device and in response to the activation request, the at least one hibernating processor core subsequent to setting the operating limit of each active processor core.

8. The method of claim 7, further comprising determining, by the computing device, an operating point of each active processor core.

9. The method of claim 8, further comprising determining, by the computing device, whether the operating point of each active processor core is at, or below, the new operating limit.

10. The method of claim 7, wherein determining the new operating limit for each active processor core comprises determining, by the computing device, a voltage operating limit for the each active processor core based on the number of active processor cores and the activation request.

11. The method of claim 7, wherein determining the new operating limit for each active processor core comprises determining, by the computing device, a voltage operating limit and a frequency operating limit for each active processor core based on the number of active processor cores and the activation request.

12. One or more non-transitory, computer-readable storage media comprising a plurality of instructions that in response to being executed cause a computing device to:

determine a number of active processor cores of a processor of the computing device;

receive an activation request for at least one hibernating processor core of the processor of the computing device, wherein the activation request includes a command that the at least one hibernating processor core become active;

determine a new operating limit for each active processor core based on the number of active processor cores and the number of hibernating processor cores identified by the activation request;

set an operating limit of each active processor core to the new operating limit; and activate, in response to the activation request, the at least one hibernating processor core subsequent to setting the operating limit of each active processor core.

13. The one or more non-transitory, computer-readable storage media of claim 12, further comprising a plurality of instructions that in response to being executed cause the computing device to determine an operating point of each active processor core.

14. The one or more non-transitory, computer-readable storage media of claim 13, further comprising a plurality of instructions that in response to being executed cause the computing device to determine whether the operating point of each active processor core is at, or below, the new operating limit.

15. The one or more non-transitory, computer-readable storage media of claim 12, wherein to determine the number of hibernating processor cores in the processor comprises to determine which processor cores are in a low power state.

16. The one or more non-transitory, computer-readable storage media of claim 12, wherein to determine the new operating limit for each active processor core comprises to determine a voltage operating limit for the each active processor core based on the number of active processor cores and the activation request.

17. The one or more non-transitory, computer-readable storage media of claim 12, wherein to determine the new operating limit for each active processor core comprises to determine a voltage operating limit and a frequency operating limit for each active processor core based on the number of active processor cores and the activation request.

18. A power management system for managing power of a plurality of variable power devices during an activation cycle of another variable power device, the power management system comprising:

a power management circuit to (i) receive an activation request for a hibernating variable power device of the plurality of variable power devices, (ii) determine a number of active variable power devices of the plurality of variable power devices, (iii) determine a new operating limit for each active variable power device based on the total number of active variable power devices and the hibernating variable power device, (iv) set an operating limit of each active variable power device to the corresponding new operating limit, and (v) activate the hibernating variable power device, in response to receiving the activation request, and subsequent to setting the operating limit of each active variable power device.

19. The power management system of claim 18, wherein to determine the new operating limit of each active variable power device comprises to determine operational requirements of each active variable power device.

20. The power management system of claim 18, wherein to determine the new operating limit comprises to (ii) determine a starting operating limit for the hibernating variable power device included in the activation request.

21. The power management system of claim 18, wherein the power management circuit is further to determine an operating point of each active variable power device.

22. The power management system of claim 21, wherein to determine the operating point comprises to determine whether the operating point of each active variable power device is at, or below, the new operating limit.

* * * * *